(12) United States Patent
Hirano

(10) Patent No.: US 12,393,438 B2
(45) Date of Patent: Aug. 19, 2025

(54) INFORMATION PROCESSING SYSTEM

(71) Applicant: TOYOTA JIDOSHA KABUSHIKI KAISHA, Toyota (JP)

(72) Inventor: Yuichi Hirano, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 514 days.

(21) Appl. No.: 17/663,875

(22) Filed: May 18, 2022

(65) Prior Publication Data

US 2022/0391241 A1 Dec. 8, 2022

(30) Foreign Application Priority Data

Jun. 7, 2021 (JP) .................................. 2021-095177

(51) Int. Cl.
*G06F 9/455* (2018.01)

(52) U.S. Cl.
CPC .. *G06F 9/45558* (2013.01); *G06F 2009/4557* (2013.01); *G06F 2009/45591* (2013.01)

(58) Field of Classification Search
CPC ......... G06F 9/45558; G06F 2009/4557; G06F 2009/45591; G06F 11/3664; G06F 11/3684
See application file for complete search history.

(56) References Cited

U.S. PATENT DOCUMENTS

| | | | |
|---|---|---|---|
| 10,372,572 B1* | 8/2019 | Kesarwani | G06F 11/261 |
| 2008/0034093 A1* | 2/2008 | Sutou | G06F 9/5083 |
| | | | 709/226 |
| 2015/0378763 A1* | 12/2015 | Hassine | G06F 11/3006 |
| | | | 718/1 |
| 2019/0173764 A1* | 6/2019 | Di Martino | H04L 41/122 |
| 2019/0227793 A1* | 7/2019 | Ramasamy | G06Q 10/06398 |

FOREIGN PATENT DOCUMENTS

| | | |
|---|---|---|
| JP | 2008-33852 A | 2/2008 |
| JP | 2010-113381 A | 6/2010 |
| JP | 4751265 B2 | 8/2011 |
| JP | 2018-85135 A | 5/2018 |
| JP | 2018-85136 A | 5/2018 |
| JP | 2018-205796 A | 12/2018 |
| JP | 2019-66995 A | 4/2019 |
| JP | 2020-71571 A | 5/2020 |

\* cited by examiner

*Primary Examiner* — Dong U Kim
(74) *Attorney, Agent, or Firm* — Oblon, McClelland, Maier & Neustadt, L.L.P.

(57) ABSTRACT

An information processing system includes a first running virtual machine that is configured to run an application and in which specifications on the application are changed for a trial, and a second running virtual machine that is configured to run an application and in which specifications on the application are not changed for a trial.

3 Claims, 3 Drawing Sheets

INFORMATION PROCESSING SYSTEM

CROSS-REFERENCE TO RELATED APPLICATION

This application claims priority to Japanese Patent Application No. 2021-095177 filed on Jun. 7, 2021, incorporated herein by reference in its entirety.

BACKGROUND

1. Technical Field

The disclosure relates to an information processing system and, more specifically, to an information processing system that provides an environment in which an application is run.

2. Description of Related Art

A computer system is generally desired to operate stably. Therefore, various technologies for stably operating the system have been suggested. For example, Japanese Patent No. 4751265 (JP 4751265 B) describes a resource management system capable of continuously running a business service and effectively using a common resource.

SUMMARY

Incidentally, there is a need to execute a process according to determined specifications with which a desired process result is obtained and a process of trying various specifications to determine specifications for obtaining another desired result in parallel by using data output from a data providing apparatus. However, when a server is used to execute these processes, stable execution of the process according to the determined specifications can be impaired due to the influence of load of the process of trying various specifications.

The disclosure provides an information processing system capable of stably executing a process according to determined specifications and executing a process of trying various specifications in parallel.

An aspect of the disclosure relates to an information processing system. The information processing system includes a first running virtual machine that is configured to run an application and in which specifications on the application are changed for a trial, and a second running virtual machine that is configured to run an application and in which specifications on the application are not changed for a trial. With the information processing system, it is possible to separately manage an environment in which a trial is made and an environment in which no trial is made. For this reason, even when there occurs an overload state due to, for example, an unexpected increase in load resulting from a trial, running of an application in the environment in which no trial is made is not influenced. Therefore, it is possible to stably execute a process according to determined specifications and execute a process of trying various specifications in parallel.

In the above aspect, the information processing system may further include a first accumulating virtual machine configured to accumulate data used by the application that is run on the first running virtual machine, and a second accumulating virtual machine configured to accumulate data used by the application that is run on the second running virtual machine. With this configuration, it is possible to separately accumulate data used in an environment in which a trial is made and data used in an environment in which no trial is made. For this reason, it is possible to avoid the influence of the load of data access for a trial on data access in an environment in which no trial is made. Therefore, it is possible to further stably execute a process according to determined specifications.

In the above aspect, the first accumulating virtual machine may be configured such that specifications of accumulation of the data are changed for a trial, and the second accumulating virtual machine may be configured such that specifications of accumulation of the data are not changed for a trial. With this configuration, it is possible to stably execute a process according to determined specifications and to make various trials for specifications of accumulation.

In the above aspect, the information processing system may further include a reference virtual machine configured to accumulate replicated data of the data accumulated in the second accumulating virtual machine, and the first running virtual machine may be configured to access the data accumulated in the first accumulating virtual machine or the replicated data accumulated in the reference virtual machine and run the application. With this configuration, it is possible to use data accumulated for a process according to determined specifications in a process for a trial of specifications without influence on data access through a process according to determined specifications.

In the above aspect, the information processing system may further include a first collection virtual machine configured to collect the data to be accumulated in the first accumulating virtual machine and transmit the data to the first accumulating virtual machine, and a second collection virtual machine configured to collect the data to be accumulated in the second accumulating virtual machine and transmit the data to the second accumulating virtual machine. With this configuration, it is possible to separately collect and accumulate data used in an environment in which a trial is made and data used in an environment in which no trial is made. For this reason, it is possible to avoid the influence of a trial on collection and accumulation of data for an environment in which no trial is made. Therefore, it is possible to further stably execute a process according to determined specifications.

In the above aspect, the first collection virtual machine may be configured such that specifications of collection or transmission of the data are changed for a trial, and the second collection virtual machine may be configured such that specifications of collection or transmission of the data are not changed for a trial. With this configuration, it is possible to stably execute a process according to determined specifications and to make various trials for specifications of accumulation.

In the above aspect, the information processing system may have a set of the first collection virtual machine and the second collection virtual machine for each apparatus group that outputs the data. With this configuration, it is possible to control transmission of data to a virtual machine for collecting and accumulating data by the unit of a predetermined apparatus group. In other words, it is possible to perform transmission of data to the virtual machine for collecting and accumulating data in different specifications for each apparatus group.

According to the aspect of the disclosure, it is possible to provide an information processing system capable of stably executing a process according to determined specifications and executing a process of trying various specifications in parallel.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the disclosure will be described with reference to the accompanying drawings.

First Embodiment

Figure 1:
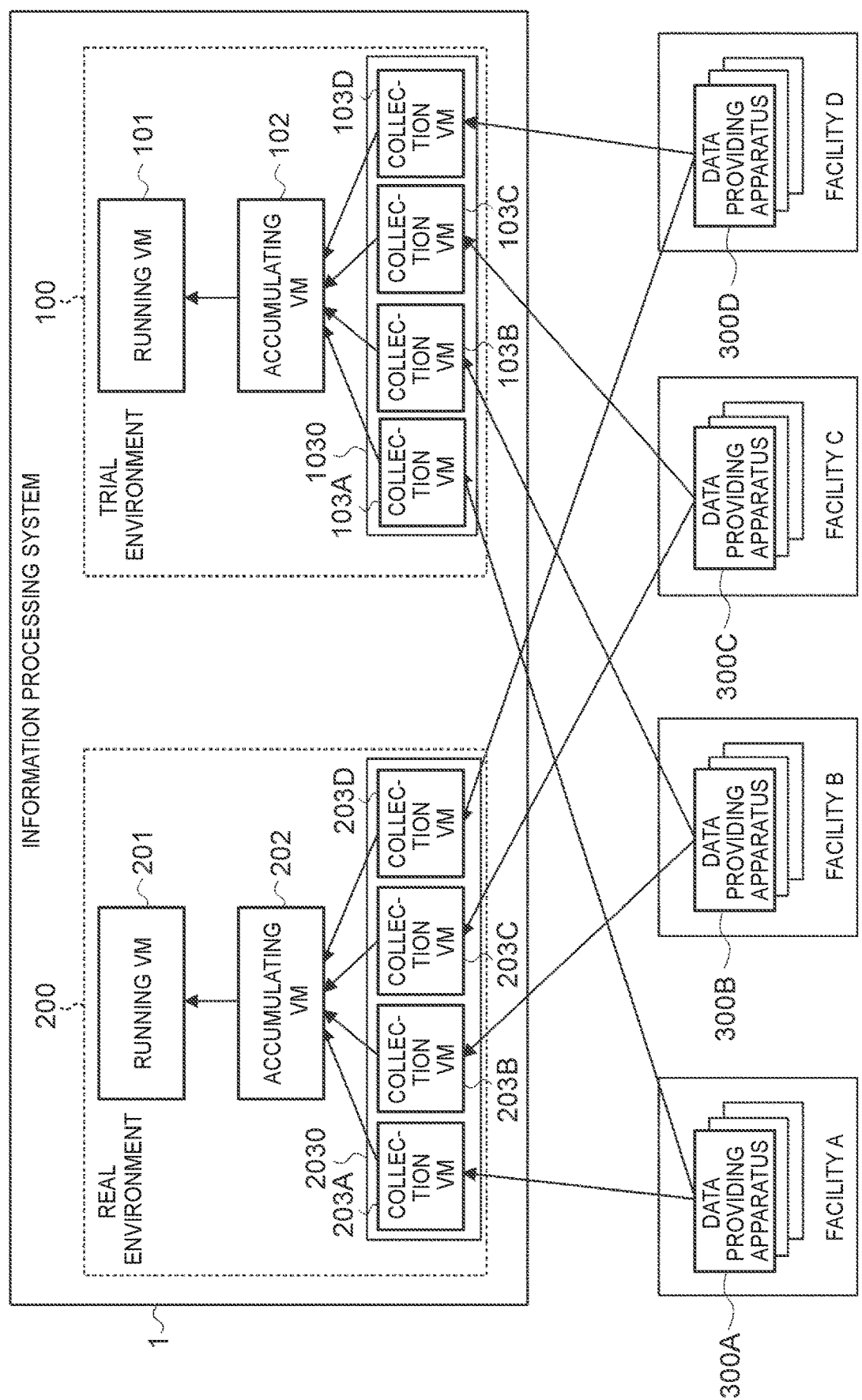
FIG. 1 is a block diagram showing an example of the configuration of an information processing system according to a first embodiment.

FIG. 1 is a block diagram showing an example of the configuration of an information processing system 1 according to a first embodiment. For the sake of understanding, FIG. 1 shows not only the information processing system 1 but also data providing apparatuses 300A, 300B, 300C. 300D that provide data to be used in the information processing system 1. In the following description, the data providing apparatuses 300A, 300B, 300C, 300D are referred to data providing apparatuses 300 when not distinguished from one another.

The information processing system 1 is a server (physical machine) that includes a trial environment 100 in which various specifications related to a process of an application are changed, and a real environment 200 in which various specifications related to an application are not changed. The trial environment 100 is an environment in which a process of trying various specifications is executed to determine specifications for obtaining a desired result. In contrast, the real environment 200 is an environment in which a process according to determined specifications with which a desired process result is obtained is executed. Through a trial and error process in the trial environment 100, when specifications of the process are determined, the specifications are transferred to the real environment 200 as determined specifications. Multiple types of applications may be run in the real environment 200 or the trial environment 100. In other words, in the real environment 200, a process according to a plurality of different determined specifications may be executed. In other words, a process of an application according to specifications for which a trial has been completed in the trial environment 100 is added to the real environment 200 as needed.

An application that is run on the information processing system 1 may be any application that executes a selected process using data output from the data providing apparatus 300 (described later) and may be, for example, a business intelligence (BI) tool, an analysis tool, or the like.

Figure 2:
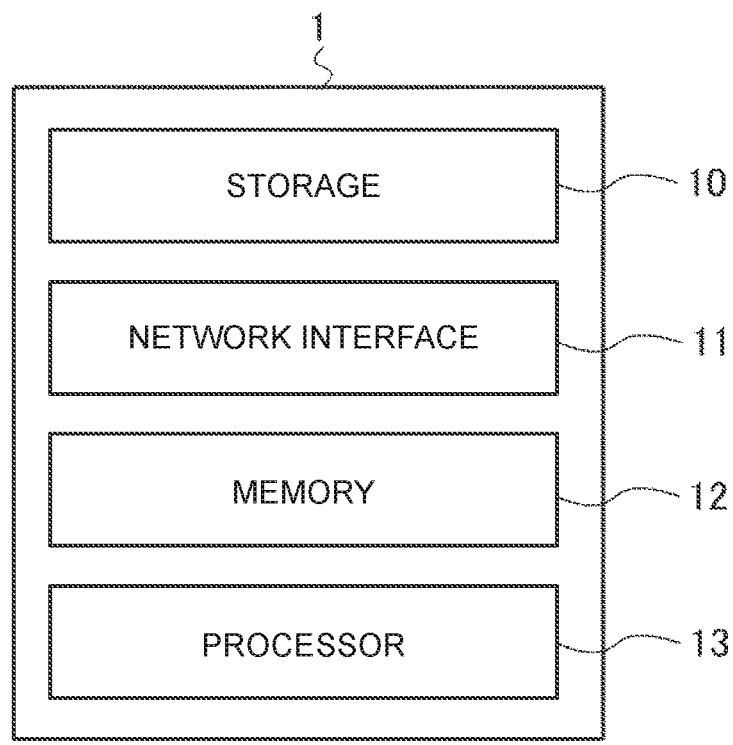
FIG. 2 is a block diagram showing an example of the hardware configuration of the information processing system according to the embodiment.

FIG. 2 is a block diagram showing an example of the hardware configuration of the information processing system 1. The information processing system 1 includes, for example, a storage 10, a network interface 11, a memory 12, a processor 13, and the like as physical resources.

The storage 10 is made up of, for example, a hard disk drive (HDD), a solid state drive (SSD), or the like. The storage 10 is used to store data and the like used in processes of the information processing system 1.

The network interface 11 is used to communicate with other apparatuses (for example, the data providing apparatuses 300A, 300B, 300C, 300D, and the like). The network interface 11 may include, for example, a network interface card (NIC).

The memory 12 is made up of, for example, a combination of a volatile memory and a nonvolatile memory. The memory 12 is used to store a program and the like that are run by the processor 13.

The processor 13 executes a process of the information processing system 1 by reading out and running a program from the memory 12. The processor 13 may be, for example, a microprocessor, a micro processing unit (MPU), a central processing unit (CPU), or the like.

A program includes a command set (or software code) for causing a computer to execute one or more functions described in the embodiment when the program is loaded onto the computer. The program may be supplied to a non-transitory computer-readable medium or tangible storage medium. Nonrestrictive examples of the computer-readable medium or tangible storage medium include memory technologies, such as a random-access memory (RAM), a read-only memory (ROM), a flash memory, a solid-state drive (SSD), and others, optical disk storages, such as a CD-ROM, a digital versatile disc (DVD), a Blu-ray (registered trademark), and others, and magnetic storage devices, such as a magnetic cassette, a magnetic tape, a magnetic disk storage, and others. The program may be transmitted on a temporary computer-readable medium or communication medium. Nonrestrictive examples of the temporary computer-readable medium or communication medium include an electrical, optical, acoustic, or other-type propagation signals.

Each of virtual machines (hereinafter, referred to as VMs) (described later) included in the trial environment 100 and the real environment 200 is implemented by using the above-described physical resources of the information processing system 1. Each VM uses physical resources allocated to the VM. As shown in FIG. 1, the information processing system 1 includes two sets, that is, a set of VMs used as the real environment 200 and a set of VMs used as the trial environment 100.

The trial environment 100 includes a running VM 101, an accumulating VM 102, and a collection VM 1030. The collection VM 1030 is made up of collection VMs 103A, 103B, 103C, 103D. In the example shown in the drawing, the collection VM 1030 is made up of a plurality of VMs. Alternatively, the collection VM 1030 may be made up of a single VM. In the following description, the collection VMs 103A, 103B, 103C, 103D are referred to as the collection VMs 103 when not specifically distinguished from one another. Similarly, the collection VMs 203A, 203B, 203C, 203D (described later) are referred to as collection VMs 203 when not specifically distinguished from one another.

The running VM 101 is a VM that runs an application. In the running VM 101, specifications on an application are changed for a trial based on an instruction from a user. For example, to run a new application in the real environment 200, a trial and error for determining specifications of the new application is performed. Therefore, the running VM 101 executes the process of an application according to specifications set on a trial basis. A user is able to freely change the specifications of an application that is run on the running VM 101. In other words, a user is able to freely access the running VM 101 from a terminal device (not shown) and freely change the specifications of an application that is run on the running VM 101. The running VM 101 executes the process of an application according to specifications set by using data accumulated in the accumulating VM 102. The running VM 101 may change the data format of data accumulated in the accumulating VM 102 as needed in accordance with the set specifications and then use the data. The running VM 101 may have a data mart that stores data acquired from the accumulating VM 102 for each application. In this case, the above-described specifications may be the specifications of the data mart.

The accumulating VM 102 is a VM that accumulates data used by an application that is run on the running VM 101. In the accumulating VM 102, specifications of accumulation of data are changed for a trial based on an instruction issued by a user. The specifications of accumulation of data may be, for example, specifications to designate the format of a database and may be specifications that designate the format of a file for accumulating data in file format. For example, to run a new application in the real environment 200, a trial and error for determining specifications of the new application is performed. Therefor, the accumulating VM 102 executes the process of accumulating data in accordance with specifications set on a trial basis. A user is able to freely change the specifications of accumulation of data in the accumulating VM 102. In other words, a user is able to freely access the accumulating VM 102 from a terminal device (not shown) and freely change the specifications of accumulation of data in the accumulating VM 102. The accumulating VM 102 accumulates data by storing data transmitted from the collection VM 103 in the storage 10 or the like in accordance with the designated specifications.

The collection VM 103 is a VM that collects data to be accumulated in the accumulating VM 102 and that transmits the data to the accumulating VM 102. In the information processing system 1 according to the present embodiment, the collection VM 103 is provided for each apparatus group that outputs data. In other words, the collection VM 103 is provided for each group of the data providing apparatuses 300. However, as described above, the collection VM 103 may be provided one for a plurality of groups. In the present embodiment, as an example, the data providing apparatuses 300 are separated into four groups. The first group is a group consisting of one or plurality of data providing apparatuses 300A that belong to facility A. The second group is a group consisting of one or plurality of data providing apparatuses 300B that belong to facility B. The third group is a group consisting of one or plurality of data providing apparatuses 300C that belong to facility C. The fourth group is a group consisting of one or plurality of data providing apparatuses 300D that belong to facility D. For example, facility A, facility B, facility C, and facility D are different factories, and specific examples of facilities are not limited thereto. In the example shown in FIG. 1, the data providing apparatuses 300 are separated into four groups, and, accordingly, the information processing system 1 includes four data providing apparatuses 300A, 300B, 300C, 300D; however, the number of groups is, of course, not limited to four.

Data provided by the data providing apparatus 300 to the information processing system 1 may be, for example, progress data of manufacturing steps or output values (current values, torque values, and other values) of manufacturing apparatuses (for example, robots and the like) that manufacture products. These are only examples of data provided by the data providing apparatus 300 to the information processing system 1, and the data providing apparatus 300 outputs selected data required by an application.

The data providing apparatus 300 may be an apparatus from which data to be used by the information processing system 1 is generated or may be an apparatus (for example, edge apparatus) for acquiring data from such an apparatus and transmitting the acquired data. The data providing apparatus 300A transmits data to be used in the trial environment 100 to the collection VM 103A and transmits data to be used in the real environment 200 to the collection VM 203A. Similarly, the data providing apparatus 300B transmits data to be used in the trial environment 100 to the collection VM 103B and transmits data to be used in the real environment 200 to the collection VM 203B. The data providing apparatus 300C transmits data to be used in the trial environment 100 to the collection VM 103C and transmits data to be used in the real environment 200 to the collection VM 203C. Furthermore, the data providing apparatus 300D transmits data to be used in the trial environment 100 to the collection VM 103D and transmits data to be used in the real environment 200 to the collection VM 203D. Therefore, the collection VM 103A of the trial environment 100 collects data from the data providing apparatus 300A of facility A, the collection VM 103B collects data from the data providing apparatus 300B of facility B, the collection VM 103C collects data from the data providing apparatus 300C of facility C, and the collection VM 103D collects data from the data providing apparatus 300D of facility D.

Each of the data providing apparatuses 300 may occasionally transmit data to the collection VM 103 (collection VM 203) and may transmit data to the collection VM 103 (collection VM 203) in accordance with a request from the collection VM 103 (collection VM 203). When the collection VM 103 (collection VM 203) makes a request of the data providing apparatus 300 to transmit data, the request may be made in accordance with set specifications. For example, the specifications may be specifications for designating the type of data to be collected, the format of data, data amount, the timing of collection, and the like. The collection VM 103 transmits the collected data to the accumulating VM 102. For example, the collection VM 103 temporarily stores the collected data in the storage 10 or the like and transmits the collected data to the accumulating VM 102 at the timing set in the specifications. At that time, the collection VM 103 may transmit data of the data amount set in the specifications to the accumulating VM 102. With this configuration, it is possible to accumulate data in the accumulating VM 102 according to the plan, so it is possible to control a load on the accumulating VM 102. In the collection VM 103, the specifications of collection of data from the data providing apparatus 300 and transmission of data to the accumulating VM 102 are changed for a trial based on an instruction from a user. In other words, the above-described specifications on the process of the collection VM 103 are freely changed. For example, to run a new application in the real environment 200, a trial and error for determining specifications on correction of data to be used by the new application from the data providing apparatus 300 or transmission of the data to the accumulating VM 102 (accumulating VM 202) is performed. Therefore, the collection VM 103 executes the process of collecting data and the process of transmitting data according to specifications set on a trial basis. A user is able to freely change the specifications of a process in the collection VM 103. In other words, a user is able to freely access the collection VM 103 from a terminal device (not shown) and freely change the specifications of a process in the collection VM 103.

Next, the real environment 200 will be described. The real environment 200 includes a running VM 201, the accumulating VM 202, and a collection VM 2030. The collection VM 2030 is made up of collection VMs 203A, 203B, 203C, 203D. In the example shown in the drawing, as well as the collection VM 1030, the collection VM 2030 is made up of a plurality of VMs. Alternatively, the collection VM 2030 may be made up of a single VM. As described above, the real environment 200 is an environment in which specifications are not changed for a trial on an application. In the present embodiment, specifications are configured to be not changed for a trial in the real environment 200 by providing an operational rule disabling free access of any user to the running VM 201, the accumulating VM 202, and the collection VM 203 that belong to the real environment 200. Alternatively, specifications may be not changed for a trial may be configured to be not changed in the real environment 200 by limiting access to the running VM 201, the accumulating VM 202, and the collection VM 203. For example, the running VM 201, the accumulating VM 202, and the collection VM 203 may be controlled to not accept access from a user other than a predetermined administrator to disable a change of specifications for a trial in the real environment 200. In this way, the running VM 201, the accumulating VM 202, and the collection VM 203 may be VMs disabled to change specifications in accordance with an operational rule or may be VMs that limit access for changing specifications.

The running VM 101 is a VM that runs an application. In the running VM 201, specifications on the application are not changed for a trial. The running VM 201 executes the process of an application according to set specifications by using data accumulated in the accumulating VM 202. The running VM 201 may change the data format of data accumulated in the accumulating VM 202 as needed in accordance with the set specifications and then use the data. The running VM 201 may have a data mart that stores data acquired from the accumulating VM 202 for each application. Specifications that define the process of the running VM 201 are specifications determined through a trial and error in the trial environment 100 and are, for example, transferred from the running VM 101 to the running VM 201 by an administrator.

The accumulating VM 202 is a VM that accumulates data to be used by an application that is run on the running VM 201. However, in the accumulating VM 202, specifications of accumulation of data are not changed for a trial. The accumulating VM 202 accumulates data by storing data transmitted from the collection VM 203 in the storage 10 or the like in accordance with the set specifications. Specifications that define the process of the accumulating VM 202 are specifications determined through a trial and error in the trial environment 100 and are, for example, transferred from the accumulating VM 102 to the accumulating VM 202 by an administrator.

The collection VM 203 is a VM that collects data to be accumulated in the accumulating VM 202 and that transmits the data to the accumulating VM 202. However, in the collection VM 203, specifications of collection or transmission of data are not changed for a trial. In the information processing system 1 according to the present embodiment, as in the case of the trial environment 100, the collection VM 203 is provided for each apparatus group that outputs data. In other words, the collection VM 203 is provided for each group of the data providing apparatuses 300. However, as described above, the collection VM 203 may be provided one for a plurality of groups. The collection VM 203A collects data from the data providing apparatus 300A of facility A, the collection VM 203B collects data from the data providing apparatus 300B of facility B, the collection VM 203C collects data from the data providing apparatus 300C of facility C, and the collection VM 203D collects data from the data providing apparatus 300D of facility D. In this way, in the present embodiment, a set of the collection VM 103 and the collection VM 203 is provided for each of the apparatus groups that output data. With such a configuration, it is possible to control collection of data and transmission of data to the accumulating VM by the unit of a predetermined apparatus group. In other words, it is possible to perform transmission of data to the VM for collecting and accumulating data in different specifications for each apparatus group.

When the collection VM 203 makes a request of the data providing apparatus 300 to transmit data, the request may be made in accordance with set specifications. Transmission of data from the collection VM 203 to the accumulating VM 202 may be performed in accordance with set specifications. Specifications that define the process of the collection VM 203 are specifications determined through a trial and error in the trial environment 100 and are, for example, transferred from the collection VM 103 to the collection VM 203 by an administrator.

The first embodiment has been described above. The information processing system 1 according to the present embodiment includes the trial environment 100 and the real environment 200 as described above. For this reason, it is possible to separately operate an environment in which a trial of a process on an application is performed and an environment in which no trial is performed. In a trial of a process on an application, there is a possibility that an unexpected load may be exerted on the physical resources of the information processing system 1. However, in the present embodiment, a trial is performed in a VM different from a VM that is a component of the real environment 200. For this reason, even in the event of an overload state due to, for example, an unexpected increase in load resulting from a trial, running of an application in the real environment 200 is not influenced. Therefore, it is possible to stably execute a process according to determined specifications and execute a process of trying various specifications in parallel.

In the present embodiment, not only the running VM but also the accumulating VM is prepared for each of the real environment 200 and the trial environment 100. Thus, data to be used in the trial environment 100 and data to be used in the real environment 200 are able to be separately accumulated. For this reason, the load of data access for a trial does not influence data access in the real environment 200. Therefore, it is possible to further stably execute a process according to determined specifications.

In the present embodiment, the collection VM is prepared for each of the real environment 200 and the trial environment 100. Thus, data to be used in the trial environment 100 and data to be used in the real environment 200 are able to be separately collected and accumulated. For this reason, it is possible to avoid the influence of a trial on collection and accumulation of data for the real environment 200. In other words, for example, even when the collection VM 103 of the trial environment 100 is down, the real environment 200 is able to continue collecting data. Therefore, it is possible to further stably execute a process according to determined specifications.

Second Embodiment

Next, a second embodiment will be described. In the information processing system 1 described in the first embodiment, when a trial and error of specifications is intended to be performed by using data accumulated by the real environment 200, the running VM 101 needs to access data accumulated in the accumulating VM 202. Specifically, when, for example, a trial and error of specifications is intended to be performed by using data collected in a predetermined period by only the collection VM 203 of the real environment 200, it is necessary to use data accumulated by the real environment 200. However, if the running VM 101 accesses data accumulated by the accumulating VM 202, a processing load on the accumulating VM 202 increases, with the result that the processing load may impair stable running of an application in the real environment 200. For this reason, in the present embodiment, the configuration in which the running VM 101 of the trial environment 100 is able to use data in the accumulating VM 202 without accessing the accumulating VM 202 of the real environment 200 will be described.

Figure 3:
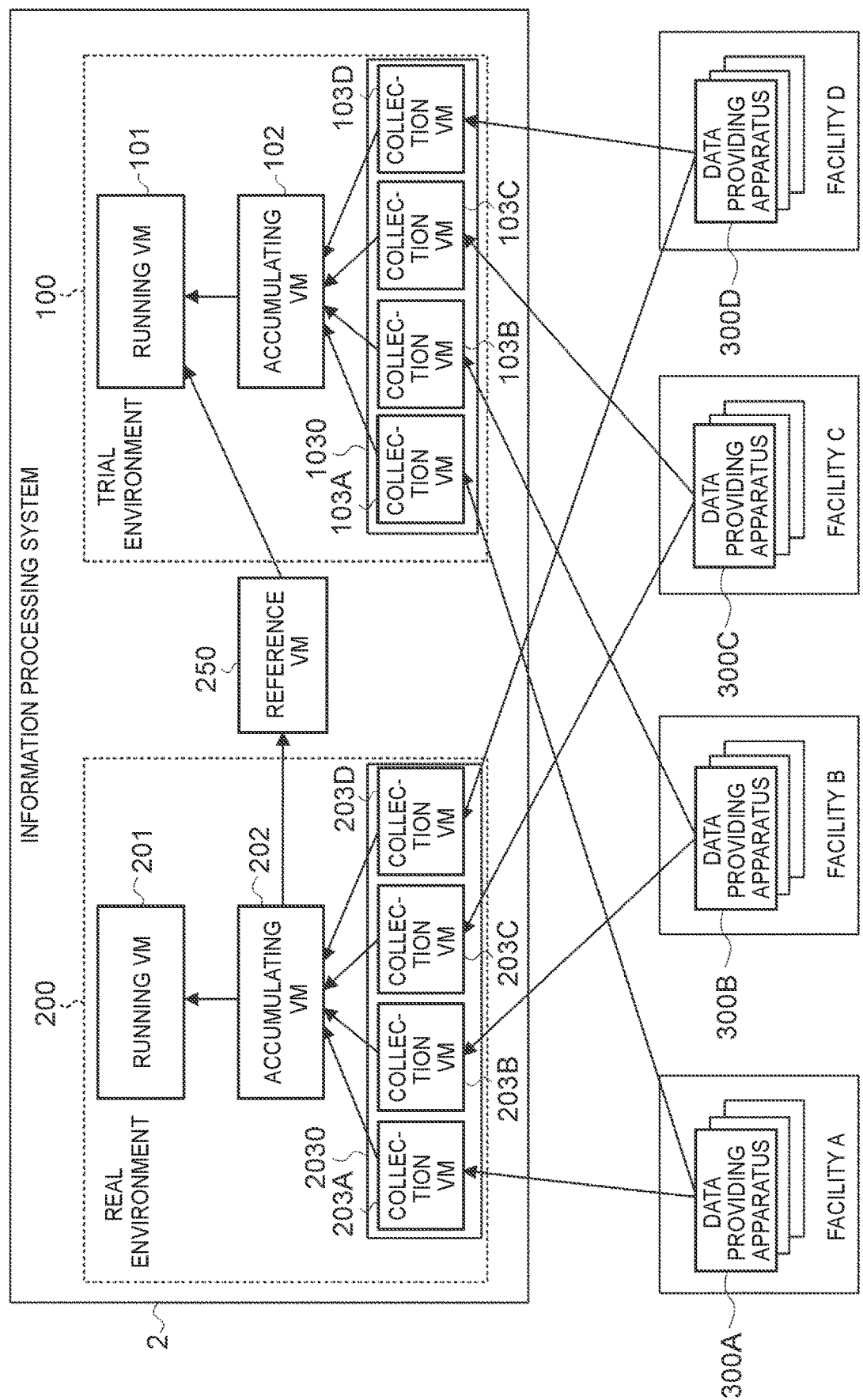
FIG. 3 is a block diagram showing an example of the configuration of an information processing system according to a second embodiment.

FIG. 3 is a block diagram showing an example of the configuration of an information processing system 2 according to the second embodiment. The information processing system 2 differs from that of the first embodiment in that a reference VM 250 is added. Hereinafter, a difference of the second embodiment from the first embodiment will be described, and the description overlapping the first embodiment is omitted as needed.

The reference VM 250 is a VM that accumulates replicated data of data accumulated by the accumulating VM 202. The reference VM 250 accumulates data by periodically acquiring data accumulated by the accumulating VM 202 and storing the data in the storage 10 or the like. Therefore, the accumulating VM 202 of the real environment 200 periodically transmits replicated data of data accumulated by the accumulating VM 202 to the reference VM 250. The reference VM 250 may accumulate replicated data of data accumulated by the accumulating VM 202 by using a database or may accumulate data without using a database.

In the present embodiment, when the running VM 101 of the trial environment 100 executes a process using data accumulated by the real environment 200, the running VM 101 accesses the reference VM 250 and acquires the data. In other words, in the present embodiment, the running VM 101 accesses data accumulated by the accumulating VM 102 or replicated data accumulated by the reference VM 250 and runs an application. The running VM 101 may access both data accumulated by the accumulating VM 102 and replicated data accumulated by the reference VM 250 and run an application.

A process in the trial environment 100, using data accumulated by the real environment 200, may be, for example, executed to improve an application already running in the real environment 200 or executed to develop a new application.

According to the present embodiment, the running VM 101 of the trial environment 100 does not directly access the accumulating VM 202 of the real environment 200 and accesses the reference VM 250 and uses data acquired by the real environment 200. Therefore, it is possible to use data accumulated for a process according to determined specifications in a process for a trial of specifications without influence on data access through a process according to determined specifications. In other words, it is possible to avoid an increase in processing load on the accumulating VM 202 due to access of the running VM 101, so it is possible to stably run an application in the real environment 200.

The disclosure is not limited to the above-described embodiments and may be modified as needed without departing from the scope of the disclosure. For example, in the above-described embodiments, the specifications of a process are able to be changed in all the VMs of the trial environment 100. Alternatively, the specifications of a process may be changed only in one or some of the VMs.

What is claimed is:

1. An information processing system comprising:
a processor; and
a memory configured to store instructions executable by the processor,
wherein the processor is configured to:
via a first running virtual machine, run a first application and in which specifications on the first application are changed for a trial;
via a second running virtual machine, run a second application and in which specifications on the second application are not changed for a trial;
via a plurality of first collection virtual machines, collect first data to be accumulated in a first accumulating virtual machine and transmit the first data to the first accumulating virtual machine;
via a plurality of second collection virtual machines, collect second data to be accumulated in a second accumulating virtual machine and transmit the second data to the second accumulating virtual machine;
via the first accumulating virtual machine, accumulate the first data used by the first application that is run on the first running virtual machine; and
via the second accumulating virtual machine, accumulate the second data used by the second application that is run on the second running virtual machine,
wherein
the plurality of first collection virtual machines include
a first collection virtual machine via which the processor is configured to store the first data from a first apparatus group in the first accumulating virtual machine in accordance with a first specification, and
a second collection virtual machine via which the processor is configured to store the first data from a second apparatus group in the first accumulating virtual machine in accordance with a second specification,
the plurality of second collection virtual machines include
a third collection virtual machine via which the processor is configured to store the second data from the first apparatus group in the second accumulating virtual machine in accordance with a third specification, and
a fourth collection virtual machine via which the processor is configured to store the second data from the second apparatus group in the second accumulating virtual machine in accordance with a fourth specification,
the first specification is different from the second specification,
the third specification is different from the fourth specification, and
the processor is further configured to:
via a reference virtual machine, accumulate replicated data of the data accumulated in the second accumulating virtual machine, and
via the first running virtual machine, avoid an increase in a processing load of the first accumulating virtual machine by accessing the replicated data accumulated in the reference virtual machine and run the first application.

2. The information processing system according to claim 1, wherein:
the first accumulating virtual machine is configured such that the first specification and the second specification are changed for a trial; and
the second accumulating virtual machine is configured such that third specification and the fourth specification are not changed for a trial.

3. The information processing system according to claim 1, wherein:
the first collection virtual machine, via which the processor is configured to store the first data from the first apparatus group, is configured such that first specification and the second specification are changed for a trial; and
the second collection virtual machine, via which the processor is configured to store the second data from the first apparatus group, is configured such that the third specification and the fourth specification are not changed for a trial.

* * * * *